No. 651,219. Patented June 5, 1900.
S. W. WARDWELL, Jr.
TENSION DEVICE FOR WINDING MACHINES.
(Application filed Apr. 28, 1899.)
(No Model.) 2 Sheets—Sheet 1.
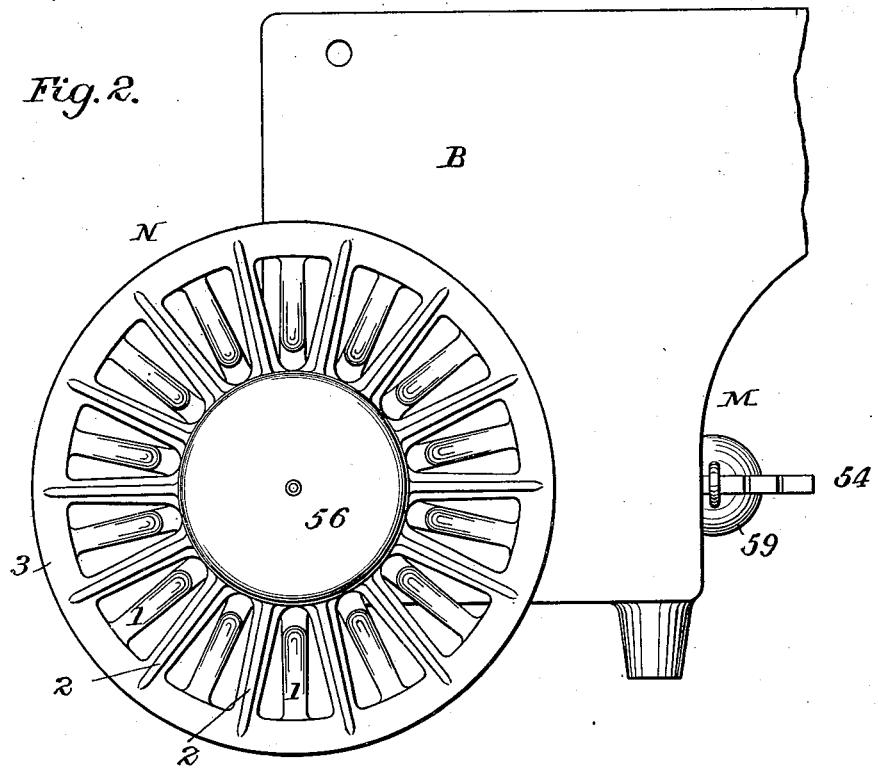
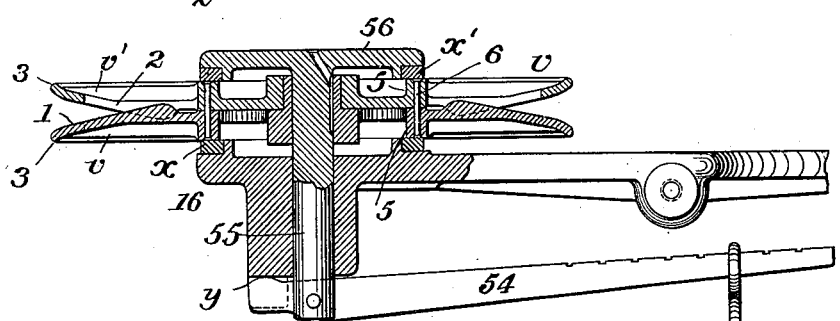
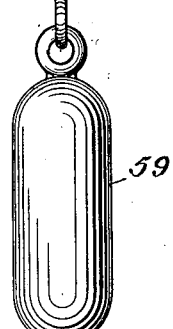
WITNESSES
INVENTOR
ATTORNEYS

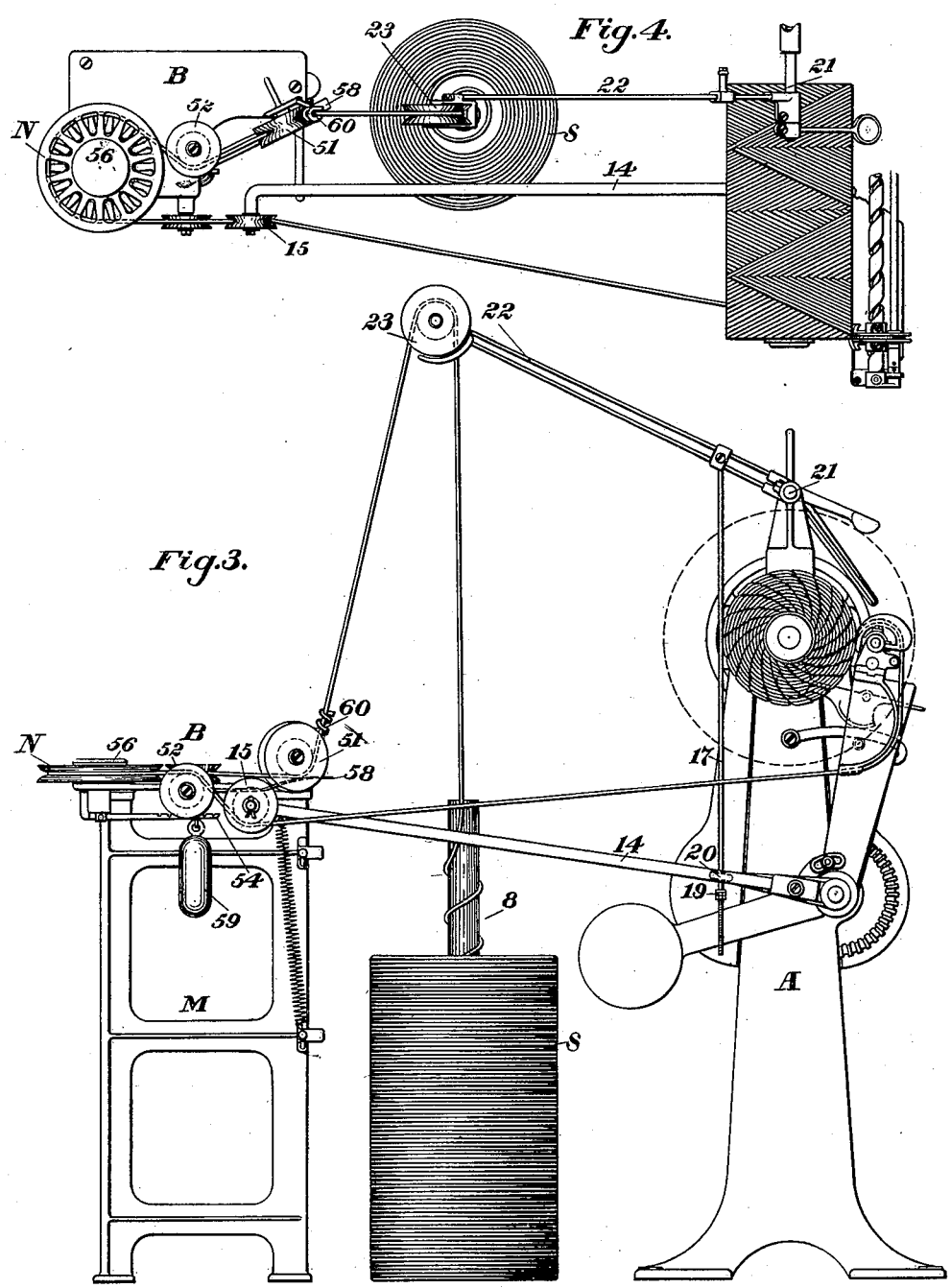

United States Patent Office.

SIMON W. WARDWELL, JR., OF PROVIDENCE, RHODE ISLAND, ASSIGNOR TO THE UNIVERSAL WINDING COMPANY, OF PORTLAND, MAINE.

TENSION DEVICE FOR WINDING-MACHINES.

SPECIFICATION forming part of Letters Patent No. 651,219, dated June 5, 1900.

Application filed April 28, 1899. Serial No. 714,884. (No model.)

*To all whom it may concern:*

Be it known that I, SIMON W. WARDWELL, Jr., a citizen of the United States, residing in the city and county of Providence, in the State of Rhode Island, have invented certain new and useful Improvements in Tension Devices for Winding-Machines, of which the following is a specification.

My invention relates to tension devices adapted for use with winding-machines or machines of any character in which thread must be conducted from a supply to an operating part as a guide or needle; and my invention consists in the construction of the wheel and other parts of a tension device, as fully set forth hereinafter, and illustrated in the accompanying drawings, in which—

Figure 1 is a sectional elevation of my improved tension device. Fig. 2 is a plan view; Fig. 3, a view illustrating the arrangement of the tension device in connection with the winding-machine. Fig. 4 is a plan of Fig. 3.

The tension-wheel N is a grooved wheel which, as shown, is arranged horizontally, although it may be arranged in any other desirable position. The wheel turns with or about a central shaft 55, which, as shown, extends through an opening in a bearing 16, constituting part of a frame M, one side of the hub of the wheel lying upon said bearing, and at the opposite side of the wheel is a friction-disk 56, which may be brought to bear with more or less pressure upon the side of the wheel, pressing the latter against its bearing 16, the wheel thus being clamped with more or less pressure between the bearings, so as to increase or vary the friction to any desired extent. As shown, the disk 56 is connected with the shaft 55, to which is pivoted a lever 54, bearing with its short arm upon some part of the frame and supporting an adjustable weight 59 upon its long arm, whereby the pressure upon the disk may be varied, as required, while the disk is prevented from turning by the extension of the short arm of the lever into a slot $y$ in the frame.

While the faces of the bearings and the hub of the wheel may be in direct contact, it is preferable to interpose some material between the same—as, for instance, rings or disks of leather or other equivalent material $x\ x'$.

The cord or thread is laid in the groove of the wheel as usual, and as the latter must turn with the travel of the thread the friction applied to the wheel is brought upon the cord or thread, securing the desired tension. In order to secure a positive adhesion of the cord or thread to the wheel and at the same time permit it to enter and leave freely the grooves thereof, and also to cheapen and facilitate the construction of the wheel, I prefer to make the same as illustrated in the drawings, in which the wheel consists of two sections or parts $v\ v'$, each having a hub-section 5 and a rim 3, and between the rim and the hub-section extends vertically a series of arms, and when the sections are brought together the arms 1 of one section alternate with the arms 2 of the other section. The rims 3 are so disposed that when the sections are brought together the rims will be separated, while the arms extend from the rims toward the hub in such manner that the arms of one section will intersect those of the other. As shown, the arms are bent or projected each series to one side, so as to enter the spaces between the arms of the other opposite section, forming a substantially V-shaped groove at the rim of the wheel. Such groove, however, instead of having continuous opposing faces, consists of alternate ribs and spaces, so that the thread or cord which is laid in the groove of the wheel, instead of lying in one plane, is waved, being bent over each arm into the opposite recess, whereby even if the thread or cord lies loosely in the groove of the wheel it will so bite or hold upon the arms thereof that there can be no possible slippage, and the wheel, of necessity, turns positively with the travel of the cord or thread.

While I have shown each section as provided with a rim 3, this is not absolutely necessary, as the arms might project outward from the hub without any protecting-rim, which, however, is desirable, in order to facilitate the introduction of the thread or cord into the groove of the wheel without catching upon the ends of the arms.

It will be seen that by constructing the wheel in two sections, as described, I am enabled to facilitate the construction, as each section may be formed of the proper shape separately better than would be practicable if the wheel consisted of parts united throughout the whole structure. As shown, the parts are brought into position and are riveted together by means of rivets.

In order to carry the thread freely from the supply S, which may be a cop or ball of any suitable character, I prefer to make use of a post 8, arranged axially on a line with and preferably within the supply and around which the thread is coiled loosely, as shown, which tends to prevent it from twisting or tangling in passing from the supply. To maintain it in proper position in passing from the supply, I arrange a pulley 23 above or in line with the supply, and in order to direct the thread or cord from the said pulley to the tension-wheel N, I make use of a guide-pulley 51, arranged as shown. The guide-pulley is a grooved pulley, and to direct the thread properly thereto I use a guide in the form of a coiled wire 60, supported by the frame of the machine in proper position, and to prevent the thread from falling out of the groove of the wheel 51 I use a yielding finger 58, which may be a spring-finger fastened to the frame and extending into the groove of the wheel below the same or near the bottom and yielding for the passage of knots, &c. From the tension-wheel N the thread or cord extends to the winding-machine A, which may be of any suitable character.

In order to secure an extended arc of contact of cord and tension-wheel, I arrange the pulley 52, which conducts the cord to the wheel, as near as possible to the point where the cord leaves the wheel.

Without limiting myself to the precise construction and arrangement of parts shown, I claim as my invention—

1. A sectional tension-wheel each section of which comprises a hub, radial arms, and a continuous rim carried by said arms, each arm having a protuberance projecting between the arms of the opposite section adjacent to the hub, the hub of one section fitted to that of the other, substantially as described.

2. A tension-wheel consisting of two parts each having a rim and a hub section and radial arms all in one piece, the arms of one section formed to intersect those of the other section near the hub when the two sections are brought together, substantially as set forth.

3. The combination with a winding-machine of a tension device comprising a tension-wheel of two sections, one of which is fitted to the hub of the other, each section provided with radial arms and a rim supported thereon, and with the arms of each section so formed as to project, at substantially their middle portion, between the arms of the opposite section, a central pin on which the tension-wheel rotates and which is susceptible of longitudinal movement, a disk attached to said pin to frictionize the wheel, with frictional material interposed between the disk and the wheel, and a lever connected with said pin and having a weight, adjustable thereon, to cause the disk aforesaid to frictionize the wheel, substantially as described.

4. The combination of the two-part tension-wheel, having radial intersecting arms and hub-sections fitted to each other and with side bearing-faces, a central spindle and disk substantially integral therewith, friction-rings intermediate the disk and the wheel, and a weighted lever for longitudinally moving the pin to press the disk toward the wheel, substantially as described.

5. The combination in a tension device, of a grooved tension-wheel, a side bearing therefor, a friction-disk at the opposite side, a shaft extending through the hub of the wheel and connected with the said disk, and a lever carrying a weight and connected to said shaft, substantially as set forth.

6. The combination of the friction-pulley, grooved guide-pulley, guide-eye, and yielding finger extending below and into the groove of the guide-pulley, substantially as set forth.

In testimony whereof I have signed my name to this specification in the presence of two subscribing witnesses.

SIMON W. WARDWELL, JR.

Witnesses:
EDWIN C. SMITH,
THOMAS M. CHILDS.